July 8, 1941.  W. H. KIRBY  2,248,760
DIRECTIONAL SIGNAL FOR AUTOMOBILES
Filed Dec. 29, 1938  3 Sheets-Sheet 1

WITNESSES:
George Du Bon
A. L. Kitchin

INVENTOR
William Harrington Kirby
BY
Munn, Anderson & Liddy
ATTORNEYS

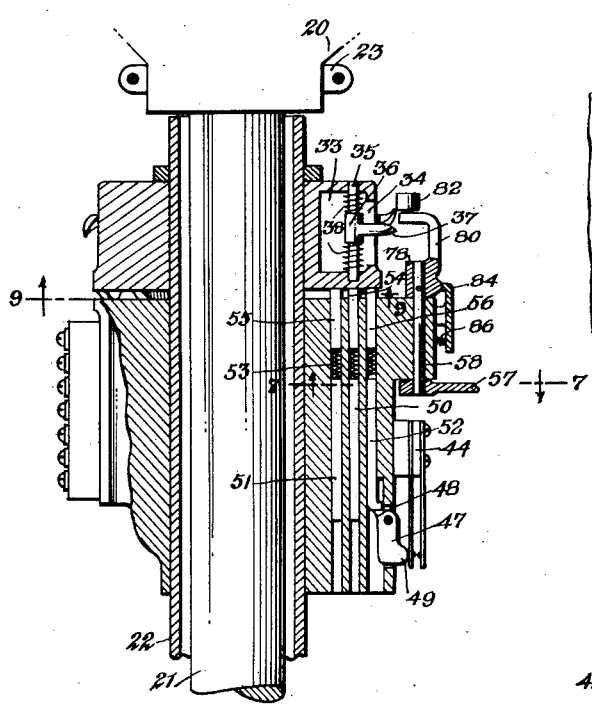
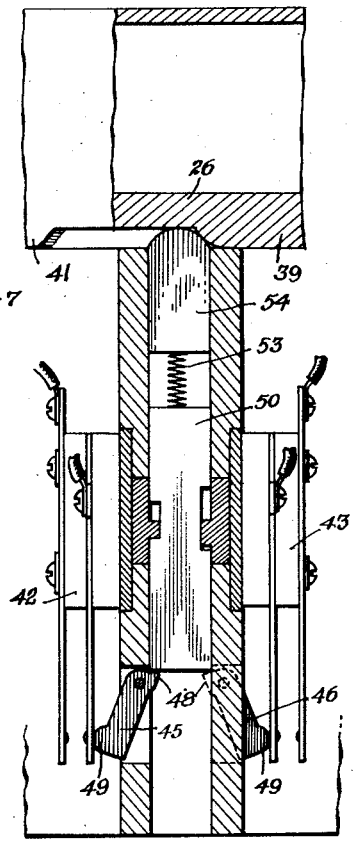
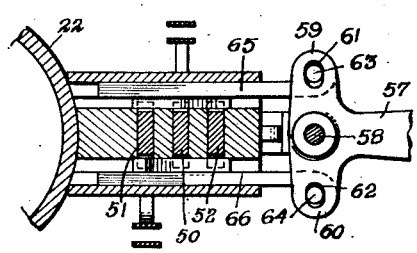
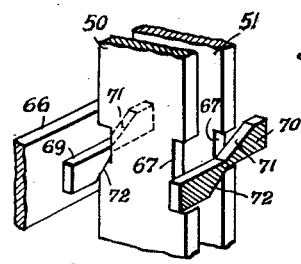

July 8, 1941.                 W. H. KIRBY                 2,248,760
                    DIRECTIONAL SIGNAL FOR AUTOMOBILES
                Filed Dec. 29, 1938         3 Sheets-Sheet 3

WITNESSES:
George Du Bon
A. L. Kitchin

INVENTOR
William Harrington Kirby
BY
Munn, Anderson & Liddy
ATTORNEYS

Patented July 8, 1941

2,248,760

UNITED STATES PATENT OFFICE

2,248,760

DIRECTIONAL SIGNAL FOR AUTOMOBILES

William Harrington Kirby, Beverly, Mass.

Application December 29, 1938, Serial No. 248,149

9 Claims. (Cl. 177—339)

This invention relates to signalling apparatus and has particular reference to automobile signalling apparatus, wherein certain lights and signals are actuated whenever the wheel of the car is moved to change the direction of movement.

The main object of the invention is to provide a simple and efficient apparatus which can be placed on the steering wheel of a car and connected with signals to either manually or automatically indicate the direction of movement.

A further object is to provide a device in which the operator can manipulate a signal operating device for a given direction of movement and means whereby this device is restored to normal when the wheel is returned to normal driving position.

A still further object has to do with the provision of a flashing signal as a warning to rear drivers whenever the car is being turned in either direction.

Yet another object of the invention is to provide means whereby the ordinary signals are cut out and a flood light cut in whenever the car is put into reverse gear.

Another object is to provide a buzzer device to operate with the flash signal as a warning to the driver and as an aid in keeping the driver from being careless when turning in a drowsy state of mind.

A still further object is to provide a device which is constructed ruggedly for durable and long life at relatively low cost requiring a minimum of replacement and repair after installation.

Further and more specific objects, features, and advantages will more clearly appear from a consideration of the specification hereinafter, when taken in connection with the accompanying drawings which form part of the specification and which illustrate a present preferred form of the invention.

Broadly and briefly the invention includes means for operating certain directional signals when the car steering wheel is turned, means for manually operating certain of said signals, and means to return the manual device to normal as the wheel is returned to normal position.

The invention further includes certain cams movable with the steering wheel and elements operated thereby to energize signals dependent upon the direction of rotation of the wheel, combined with a device for energizing a flashing signal when the wheel is turned in either direction, and means whereby a buzzer may be connected with the flashing signal at will.

A present preferred form of the invention is illustrated in the drawings, of which—

Fig. 5 is a vertical longitudinal section through the device with parts broken away;

Fig. 6 is an enlarged partial vertical section showing the details of certain switch operating elements;

Fig. 7 is a horizontal cross section taken on the line 7—7 of Fig. 6;

Fig. 8 is an enlarged partial perspective with portions broken away and in section of the means for manually operating the switches at will;

Fig. 9 is an inverted horizontal cross section taken on the line 9—9 of Fig. 5;

Figure 1:
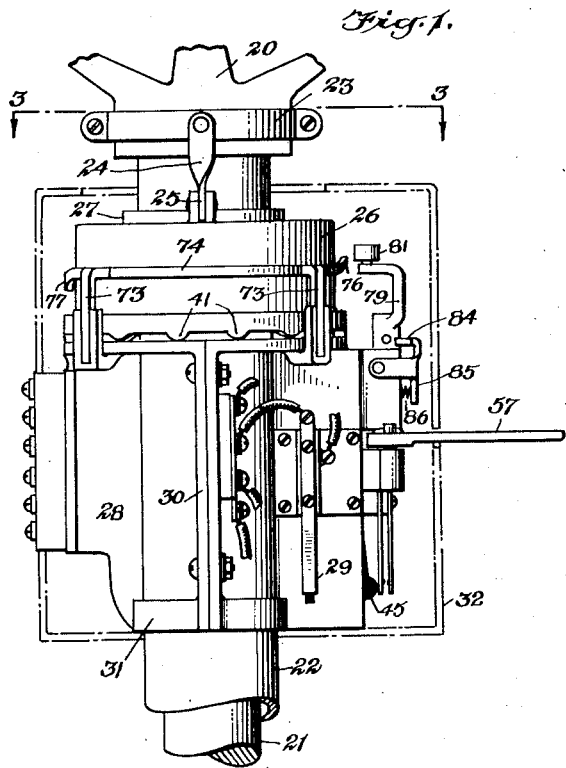
Fig. 1 is a side elevation of the device with parts broken away and the cover removed.

In the drawings there is shown a steering wheel 20, the steering shaft 21 and the fixed steering post 22. A collar 23 is clamped around the wheel 20 and dependent therefrom are links or straps 24 attached at their lower ends to studs 25 on the top of a cam drum or head 26 which is rotatable therefrom with the wheel and around the post 22. A collar 27 is swaged on to the post to hold the drum 26 at its proper level of rotation on the post 22.

Disposed on the post 22 below the drum 26 are bracket plates 28 and 29 with flanges 30 bolted together. These supporting elements are connected to the post 22 by means of a collar 31 tightly fitting the post 22. These plates form suitable supports for certain switch elements, terminal boxes, operating levers and other operating devices, as will hereinafter appear. A suitable cover 32, shown in dot and dash lines, may be disposed around this assemblage of mechanism to house the same on the steering post.

The cam drum or head 26 is provided with a recess 33 with an opening 34. In the recess is a stem 35 and slidable vertically thereon is a release dog 36 having a laterally projecting release arm 37. Disposed on the stem 35 above and below the dog 36 are springs 38 which are designed to normally hold the dog 36 in a normal position on the stem 35.

On the lower surface of the cam head 26 are disposed arcuate cams 39 and 40 spaced at different distances from the center of the post 22. Along the periphery of the said surface are a series of small cam elements 41 spaced apart and extending all around the edge of the surface to a point slightly beyond the ends of the cam strips 39 and 40 (see Fig. 9). The cam 40 is instrumental in actuating a signal light for a right-hand turn and the cam 39 for a left-hand turn and the cams 41 are used to actuate a flashing signal as the wheel is being turned regardless of the direction. Because the first of the cams 41 are seen disposed beyond the ends of the cams 39 and 40, it will be noticed that the flashing signal starts before the direction signals are illuminated.

Disposed on the bracket members are a set of switch elements 42, 43 and 44. The spring contacts of these switch elements are adapted to close by means of trip fingers of insulating material such as 45, 46 and 47 respectively. These fingers are pivoted at their upper ends on the bracket plates and have upper and lower lateral projections 48 and 49 thereon, as shown in Figs. 5 and 6. The lower projections are adapted to contact with the switch springs above-mentioned and the upper lateral projections 48 are adapted to extend beneath the lower ends of slide bars 50, 51 and 52 respectively. These bars are housed slidably in slots in the bracket frames or plates and have at their upper ends springs 53 resting thereon in the slots, and above these springs 53 and resting thereon in the slots are cam-operated blocks such as 54, 55 and 56 respectively. It will be seen that the depression of the blocks by the cams will compress the springs and cause the depression of the bars 50, 51 and 52, but that the bars 50, 51 and 52 can be depressed slightly without moving the blocks above them. As these bars are depressed their lower ends contact with the upper lateral projections 48 and pivot the trip fingers 45, 46 and 47, thus causing the lower projections 49 thereon to contact with and close the spring fingers of the switch elements 42, 43 and 44, the spring elements of which are normally open. The switch 42 controls the right-hand direction signal, the switch 43 controls the left-hand direction signal, and the switch 44 controls the intermittent flasher signal, and also the buzzer when in use.

Figure 10:
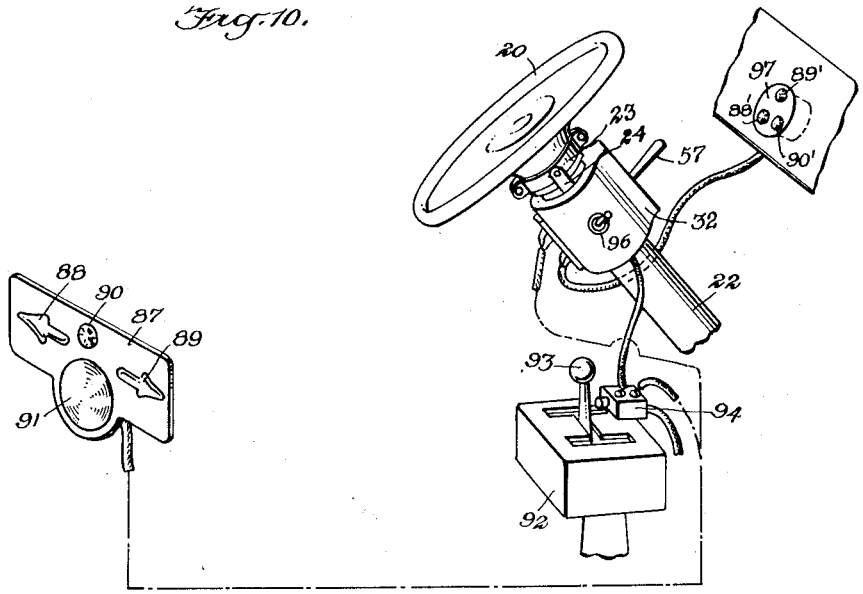
Fig. 10 is a schematic diagram of the device and its connection with the signals and the gear transmission.

In order to manually actuate the right and left-hand directional signals, I also provide a manual lever 57 connected to the lower end of shaft 58 journalled in the bracket heads or plates. This lever has oppositely extending ears 59 and 60 with holes 61 and 62 therein to loosely receive upright pins or stub shafts 63 and 64 on the ends of horizontal slide bars 65 and 66, slidably housed in suitable slots in the bracket plates or heads adjacent the side of the vertical slide bars 50, 51 and 52. These bars 50, 51 and 52 at the level of the slide bars 65 and 66 are provided with notches therein, such as 67 and 68, the notch 67 being slightly less in height than the opposite notch 68. Cam plates, such as 69 and 70, are disposed laterally on the slide bars 65 and 66 and have predetermined sloping surfaces such as 71 and 72 thereon. In the positions shown in Fig. 8, the bars are in normal neutral position but when either of the bars 65 and 66 are projected forwardly by the oscillation of the manual lever 57, its corresponding sloping surface 72 will abut the lower end of the notch 68 and depress the bar with which it engages without moving the other of the bars 50 or 51. Upon the retraction of either of the bars 65 and 66 from their forward positions, the engaged vertical bar 50 or 51 will be returned to its normal neutral position. Thus when the lever 57 is placed on the steering post it normally extends forward, as shown in Fig. 10, and when it is moved to the right it will actuate the elements above described to illuminate the right-hand direction signal which may be of any desired color. When the lever 57 is moved to the left it will similarly illuminate the left-hand direction signal which may be some other desired and contrasting color.

Figure 2:
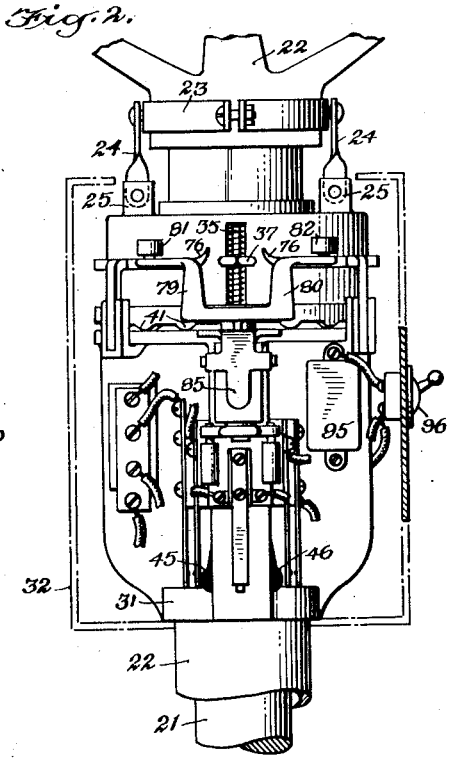
Fig. 2 is a similar front elevation.
Figure 3:
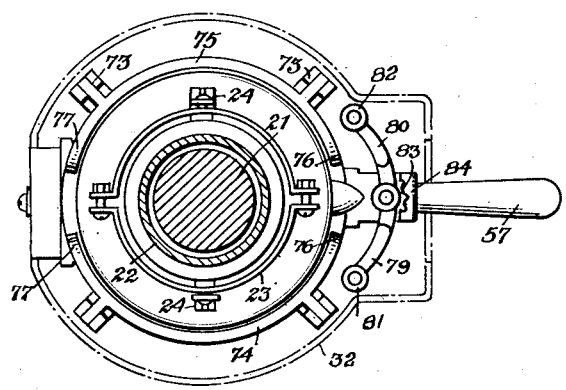
Fig. 3 is a horizontal cross section taken on the line 3—3 of Fig. 1, showing the manual signal lever in normal position.
Figure 4:
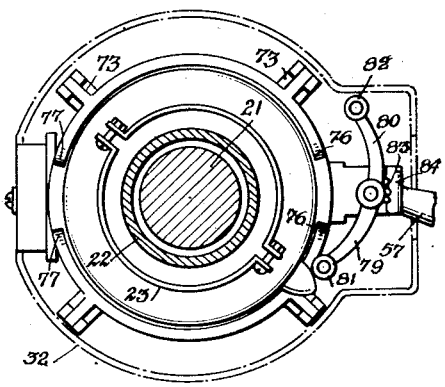
Fig. 4 is a similar view showing the manual signal lever in one operating position and about to be restored to normal position by the release dog.

Whenever it is desired to manually operate as above described, either of the direction signals, it is also desirable to restore these parts to normal condition automatically as the car wheel is straightened out even though the operator may restore the parts manually if he wishes. To achieve this automatic restoration, I provide the following mechanism: A series of upright legs such as 73 are mounted on the upper end of bracket heads or plates 28 and 29 and are spaced around but apart from the periphery of the cam drum 26. These legs 73 support two cam bars, such as 74 and 75, which are placed close to but not contacting with the adjacent lateral surface of the drum 26. These cam bars extend almost all the way around the drum 26 but their opposite ends are somewhat spaced apart. These ends are designated as 76 and 77 respectively. The ends 76 near the lever 57 and the release dog 37 are upturned as seen in Fig. 2, whereas the opposite ends 77 are downwardly turned. Except for their ends these cam bars 74 and 75 are substantially horizontal and on a level with the normal level of the release dog 37, as shown in Fig. 2. The upper end of the shaft 58, to the lower end of which the lever 57 is fastened, is provided with a block or head 78 having thereon upwardly and outwardly oppositely extending arms 79 and 80. On the upper outer ends of these arms are rotatably mounted rollers 81 and 82 at a level slightly above the normal level of the cam bars 74 and 75, as seen in Fig. 2. Normally, in the normal position of the lever 57, as shown in Fig. 3, these rollers are spaced equal distances from the surface of the drum 26 and do not contact with the projecting release dog 37 as shown. Assuming, however, that the lever 57 is moved to the right as shown in Fig. 4, then this action will advance the roller 81 close to the surface of the drum 26 and just above the cam bar 74. If the drum 26 is now moved to the right from the position shown in Fig. 2, it will be seen that the dog 37 will be forced down slightly under the cam 74 by reason of the adjacent upturned end of the cam 74 and will then rotate around under the cam bar 74 until it comes to the end of the bar 74 at the back of the device, whereupon it will pass beyond the end of the cam bar 74 and be free to spring up to normal position again. This rotation will amount to half a right turn of the steering rod 21 and wheel 20. However, as the driver then may start to straighten out the car he will start to turn the wheel in the opposite direction and this will start to rotate the drum 26 and the dog 37 in the opposite direction. As soon as this begins the dog will encounter the depressed opposite end of the cam bar 74 and on its return trip to normal position will ride on the top of the bar 74 instead of sliding beneath the same as it did on the forward trip. Therefore, as it reaches near the end of its return trip it will encounter the roller 81 as seen in Fig. 4, and continued motion of the drum 26 and the dog 37 will force the roller back to normal position and thus swing the shaft 58 back to normal, and thus restore the elements connected to the lower end of said shaft to normal position. Thus the direction signal which has been manually set can be automatically restored to normal as the car is straightened out although it is to be understood that the driver, if he wishes to and can take his attention off driving, can move the lever 57 back to normal manually at any time. This operation has been described with respect to roller 81 and cam bar 74 but it works in an exactly corresponding manner with respect to the roller 82 and the cam bar 75, which will relate to the manual setting and automatic restoration of the left-hand direction signal. The back of the block 78 is provided with three indentations such as 83 with which corresponding serrations on the upper end 84 of a pivoted latch plate 85 engage to hold the lever 57 in either one of its three positions. A spring 86 presses the latch plate 85 normally into engagement with the back of block 78.

In Fig. 10 is shown a general lay-out of the device on a car. There is the rear signal plate 87 with left and right direction arrows or signals 88 and 89, a flasher light 90, and the regular tail light 91 which may also be provided with an extra flood light bulb to be hereinafter described. The transmission 92 is provided with the usual lever 93 adjacent which in its reverse position is a cut-out switch 94 connected by suitable wires so that when the car is put into reverse the regular signal elements are cut out and the flood light above-mentioned is brought into play to indicate a backward movement of the car.

Figure 11:
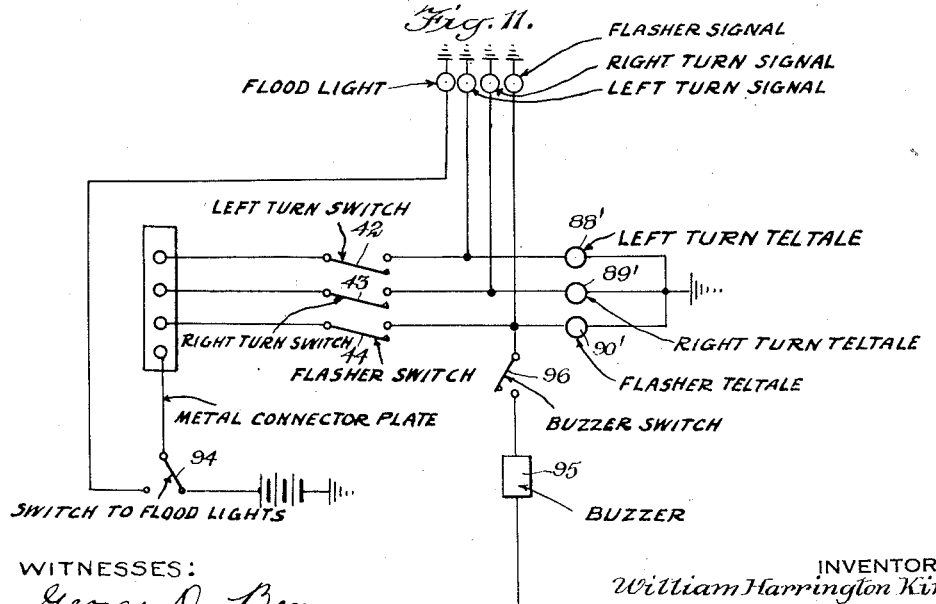
Fig. 11 is a simplified diagram of the electrical circuits involved.

In the electrical diagram shown in Fig. 11 the switch 94 is shown which when swung as indicated in the arrows will disconnect the regular direction signals and connect the battery to the flood light. A buzzer 95 is connected through a switch 96 with the flasher signal circuit so that when its switch is closed it will sound as long as the car is turning and to warn the driver and prevent drowsy action at this time. The dash board of the car may be provided with a casing 97 which contains another set of lights such as 88', 89' and 90' corresponding to those at the rear, so that the driver can have in front of him at all times a duplicate of the action of the system while operating the car. The wires shown in the figure in parallel with the lights 88', 89' and 90' are extended to the lights at the rear of the car shown in Fig. 10.

With the parts in normal position, it will be assumed the driver connected the signalling device with the circuit of the car through suitable plugs and cables (not shown) or it may be installed already connected. With the lever 57 in normal position he then starts his car and proceeds. As soon as he wishes to turn left he turns the wheel, which turns the drum 26 to the left thus passing the cam 39 over block 54 depressing it and depressing bar 50, turning finger 45 to close switch 42 connected to the left-hand signal 88. At the same time the cam projections 41 have started even before the cam 39 to depress block 56 to depress bar 52 and turn finger 47 to close switch 44 which is connected to flasher light 90, and this starts to flash intermittently as the car turns, and if the buzzer switch 96 is closed the buzzer will also start to sound. As this left turn is started, the release dog 37 passes under cam bar 74 and stays under it until returned to normal or until the wheel is turned at least half a turn, when it will operate as above described. Upon return of the wheel to normal the cams 39 and 74 become inoperative and the lever 57 is returned to normal if it has been put in the way of the dog 37.

If the driver wishes to turn to the right he turns the wheel 20 and the cam bar 40 and the cam projections 41 are brought into play. The flasher light starts to flash and the buzzer also if connected, and the cam 40 depresses block 55 depressing bar 51 which actuates finger 46 closing switch 43 connected to right direction signal 89. The dog 37 in this turn passes under cam bar 75 and in returning will knock off the roller 82 if it has been put into the path of the dog by the movement of the lever 57 to the right by manual operation.

Thus it will be seen that whenever the driver turns the wheel he will flash a light as long as he is turning, and a buzzer as well, and will also indicate a colored signal for the proper turn. He also may at any time manually indicate a turn and when he straightens out the car this signal will be extinguished automatically when he has the car back in straight line motion again, and the manual setting lever will be returned to normal if he has not had time to return it by hand himself.

When the driver goes into reverse he automatically cuts out the regular signals and throws on a powerful flood rear light which will give the signal that the car is going to back up.

The device is simple, compact, durable and rugged and can be constructed at reasonable cost for long and hard usage. It is such as will permit ready installation on any car with a minimum of time and with practically no alteration of the construction and arrangement of the regular car parts.

While the invention has been described in detail and with respect to a present preferred form thereof, it is not to be limited to such details and forms since may changes and modifications may be made in the invention without departing from the spirit and scope of the invention in its broadest aspects. Hence it is desired to cover any and all forms and modifications of the invention which may come within the language or scope of any one or more of the appended claims.

I claim:

1. An automobile signal device which comprises a plurality of cams movable with the steering wheel, a right-turn signal, a left-turn signal, a flasher signal, a plurality of cam-operated elements mounted on the steering post, a switch for each of said elements, each switch being closed by one of said elements, a signal for each of said elements, an electric circuit for each signal, each circuit including a switch and a signal, one of said cams operative on right-hand movement of the wheel for causing said right-turn signal to function, another of said cams operative on left-hand movement of the wheel for causing the left-turn signal to function, a third cam operative on movement of the wheel in either direction for causing said flasher signal to function, said third cam being operative before the operation of either of the other cams, said third cam being constructed to effect the intermittent operation of the switch with which it is connected whereby said third signal will flash intermittently.

2. An automobile signal device which comprises a plurality of cams movable with the steering wheel, a right-turn signal, a left-turn signal, a flasher signal, a plurality of cam-operated elements mounted on the steering post, a plurality of switches connected to said elements, one of said cams being operative on right-hand movement of the wheel for causing said right-turn signal to function, another of said cams being operative on left-hand movement of the wheel for causing said left-turn signal to function, a third cam operative on movement of the wheel in either direction for causing said flasher signal to function, said third cam being operative before the operation of either of the other cams, said third cam being constructed to effect the intermittent operation of the switch with which it is connected, and a buzzer, in the circuit of the third cam whereby a flashing and an audible signal will be provided when the switch of the third cam is closed for giving notice to both the driver of the automobile and to those in rear of the automobile.

3. An automobile signal device which includes a plurality of switches, means operated by the steering wheel to selectively actuate two of said switches to indicate directional movement, means also actuated by the steering wheel to actuate a third switch for causing an intermittent signal to function when the steering wheel is moved in either direction from normal and means operated by the steering wheel to restore simultaneously all of said switches.

4. An automobile signal device which includes a plurality of switches, means operated by the steering wheel to selectively actuate two of said switches to indicate directional movement, means also actuated by the steering wheel to actuate a third switch to flash an intermittent signal when the steering wheel is moved in either direction from normal, a buzzer device, a switch connecting the buzzer device with the third switch at will and means operated by a steering wheel to restore simultaneously the first two switches and the third switch.

5. An automobile signal device which includes a plurality of switches, means operated by the steering wheel during its first half revolution to selectively actuate two of said switches to indicate directional movement, means also actuated by the steering wheel to actuate a third switch to flash an intermittent signal when the steering wheel is moved in either direction from normal any distance, manual means to close certain of said directional switches after said steering wheel has moved more than a half revolution, and means operated by the steering wheel to restore all of said switches to normal when the steering wheel is returned to normal position.

6. An automobile signal device including a plurality of self-opening switches, means operated by the steering wheel of the automobile for selectively closing said switches to indicate directional turning, said means including a pair of arc-shaped cams carried by the steering wheel, a cam block for each of said arc-shaped cams adapted to be moved downwardly by said arc-shaped cams when said steering wheel moves a certain distance, a slide bar adapted to be moved by each cam block and a swinging member actuated by each slide bar for closing a switch, manually actuated means for moving selectively said slide bars for selectively closing said switches and automatically actuated means for returning said manually actuated means to normal and said slides to normal when said steering wheel moves back to normal.

7. An automobile signal device which comprises right, left, and a plurality of flasher cams movable with the steering wheel, a right-turn signal, a left-turn signal, a flashing signal, a plurality of cam-operated elements mounted on the steering wheel, a plurality of switches positioned to be closed by said elements, there being one switch for each element, said right cam being operative on a right-hand movement of the steering wheel for causing said right-turn signal to function on a right-hand movement of said steering wheel, said left cam being operative on a left-hand movement of the steering wheel for causing said left-turn signal to function, and said flasher cams being operative on movement of the steering wheel in either direction for causing said flashing signal to function.

8. An automobile signal device which includes the steering wheel of the automobile, a plurality of switches, a right-turn signal connected to one of said switches, a left-turn signal connected to a second switch, a flasher signal connected to a third switch, a plurality of elements for operating said switches, cam structures movable with the automobile steering wheel for selectively operating said elements to close said switches, the first-mentioned switch functioning when said steering wheel is turned to the right for causing said right-turn signal to function, the second-mentioned switch functioning when said steering wheel is turned to the left for causing said left-turn signal to function, and means whereby one of said cam structures effects the operation of said third-mentioned switch intermittently whenever the steering wheel is being turned in either direction for causing said flasher signal to function, said last-mentioned cam structure being positioned to start to function before either of the other cam structures starts to function.

9. An automobile signal device which includes the steering wheel of the automobile, a plurality of self-opening switches, a right-turn signal connected to one of said switches, a left-turn signal connected to a second switch, a flasher signal connected to a third switch, a plurality of elements for closing said switches, cam means movable with said steering wheel to selectively operate said elements, means whereby the first-mentioned switch is operated intermittently on movement of the steering wheel in either direction from normal and for causing said flasher signal to function, one of said cams being operative on a right-hand movement of said steering wheel for causing said right-turn signal to function, another of said cams being operative on a left-hand movement of said steering wheel for causing said left-turn signal to function, a manually operated device for closing the switches which open and close the circuits of the right-turn and left-turn signals, and means actuated by the restoration of the steering wheel to normal straight line driving position to restore said manually operated device to normal manual position.

WILLIAM HARRINGTON KIRBY.